US010792998B2

(12) United States Patent
Ramirez Macias et al.

(10) Patent No.: US 10,792,998 B2
(45) Date of Patent: Oct. 6, 2020

(54) FUEL FILLER PIPE BRACKET

(71) Applicant: Ford Global Technologies, LLC, Dearborn, MI (US)

(72) Inventors: Rolando Ramirez Macias, Cuautitlan Izcalli (MX); Mauricio García, Mexico City (MX); Victor Cisneros, Mexico City (MX); David Tidmas, Harlow (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/254,224

(22) Filed: Jan. 22, 2019

(65) Prior Publication Data

US 2020/0231033 A1 Jul. 23, 2020

(51) Int. Cl.
*B60K 15/00* (2006.01)
*B60K 15/04* (2006.01)

(52) U.S. Cl.
CPC ...... *B60K 15/04* (2013.01); *B60K 2015/0474* (2013.01)

(58) Field of Classification Search
CPC ................................ B60K 15/04; B60K 15/05
See application file for complete search history.

(56) References Cited

U.S. PATENT DOCUMENTS

| | | | | |
|---|---|---|---|---|
| 4,469,339 A * | 9/1984 | Watanabe | ............... | B60K 15/04 280/834 |
| 4,550,923 A * | 11/1985 | Ogawa | ............... | B60K 15/04 137/354 |
| 5,560,651 A * | 10/1996 | Kami | ............... | B60G 3/20 180/296 |
| 5,664,811 A | 9/1997 | Martus et al. | | |
| 5,906,406 A * | 5/1999 | Pajakowski | ............... | B60K 15/05 220/86.2 |
| 6,877,279 B2 * | 4/2005 | Russell | ............... | B60J 10/24 49/498.1 |
| 7,185,938 B2 * | 3/2007 | Beck | ............... | B60K 15/04 292/207 |
| 7,566,089 B2 * | 7/2009 | Alfaro | ............... | B60K 15/05 280/853 |
| 8,622,442 B2 * | 1/2014 | Imatomi | ............... | B60K 15/05 292/143 |
| 8,720,968 B2 * | 5/2014 | Zalan | ............... | E05B 83/34 296/97.22 |
| 8,905,768 B2 * | 12/2014 | Hara | ............... | H01R 13/447 439/136 |
| 9,376,012 B2 * | 6/2016 | Brown | ............... | B60K 15/05 |
| 9,856,679 B2 * | 1/2018 | Ito | ............... | E05B 83/34 |
| 2003/0006629 A1 * | 1/2003 | Kimura | ............... | B60J 5/0477 296/203.03 |

(Continued)

FOREIGN PATENT DOCUMENTS

JP 2002067713 A 3/2002
JP 2004330855 A 11/2004

*Primary Examiner* — Hau V Phan
(74) *Attorney, Agent, or Firm* — Geoffrey Brumbaugh; McCoy Russell LLP

(57) ABSTRACT

Methods and systems are provided for a fuel filler pipe. In one example, a system may include a bracket comprising a bumper physically coupled to a vehicle cross-member. The bumper coming into contact with a fuel filler pipe proximal to the cross-member during some vehicle conditions to block the fuel filler pipe from contacting the cross-member.

18 Claims, 7 Drawing Sheets

(56) References Cited

U.S. PATENT DOCUMENTS

2006/0273571 A1\* 12/2006 Matsumoto ............ B60K 15/04
 280/834
2015/0252721 A1\* 9/2015 Yamada ................. F02B 53/14
 123/2

\* cited by examiner

FUEL FILLER PIPE BRACKET

FIELD

The present description relates generally to a bumper bracket for a fuel filler pipe.

BACKGROUND/SUMMARY

Fuel may be added to a fuel tank of a vehicle comprising an internal combustion engine via a fuel filler pipe. The fuel filler pipe may be proximal to a variety of vehicle components to decrease packaging constraints. During a vehicle collision, the fuel filler pipe may bend and contact a vehicle component, which may include a cross-member, which may rupture the pipe and possibly lead to a fuel leak.

Other attempts to address fuel filler pipe degradation during a collision include arranging an absorbing element proximally to the fuel filler pipe. One example approach is shown by Matsuo in JP 2002067713. Therein, a fuel filler tube may comprise a displacement absorbing part that displaces the fuel filler pipe in a forward direction away from a beam of the vehicle. Thus, the fuel filler pipe may avoid the beam. Additionally, the displacement absorbing part may replace a protector associated with fuel filler pipes of previous examples.

However, the inventors herein have recognized potential issues with such systems. As one example, vehicle architectures and arrangements may vary from vehicle to vehicle, even within a single manufacturer. Directing the fuel pipe to move in a forward direction to avoid a beam during a rear end collision may not be applicable to a variety of current vehicle arrangements. Furthermore, the displacement absorbing part may not protect the fuel filler pipe during a side-on collision. As such, the fuel filler pipe may compress and bend toward the beam or cross-member, which may result in the fuel filler pipe developing a leak.

In one example, the issues described above may be addressed by a system for a vehicle cross-member traversing a vehicle underbody adjacent to a fuel filler pipe, the cross-member comprising a bracket having a bumper coupled thereto and in contact with the fuel filler pipe. In this way, the bracket may block the fuel filler pipe from contacting the cross-member during a vehicle collision.

As one example, the bumper is physically coupled to the bracket and arranged between the fuel filler pipe and the cross-member. The bumper may absorb energy from the fuel filler pipe during a collision or other vehicle maneuver which may otherwise lead to movement of the fuel filler pipe such that it would contact the cross-member. As such, the fuel filler pipe may be blocked from contacting the cross-member, thereby mitigating a likelihood of a leak developing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A-7 are shown approximately to scale, although other relative dimensions may be used, if desired.

DETAILED DESCRIPTION

Figure 1:
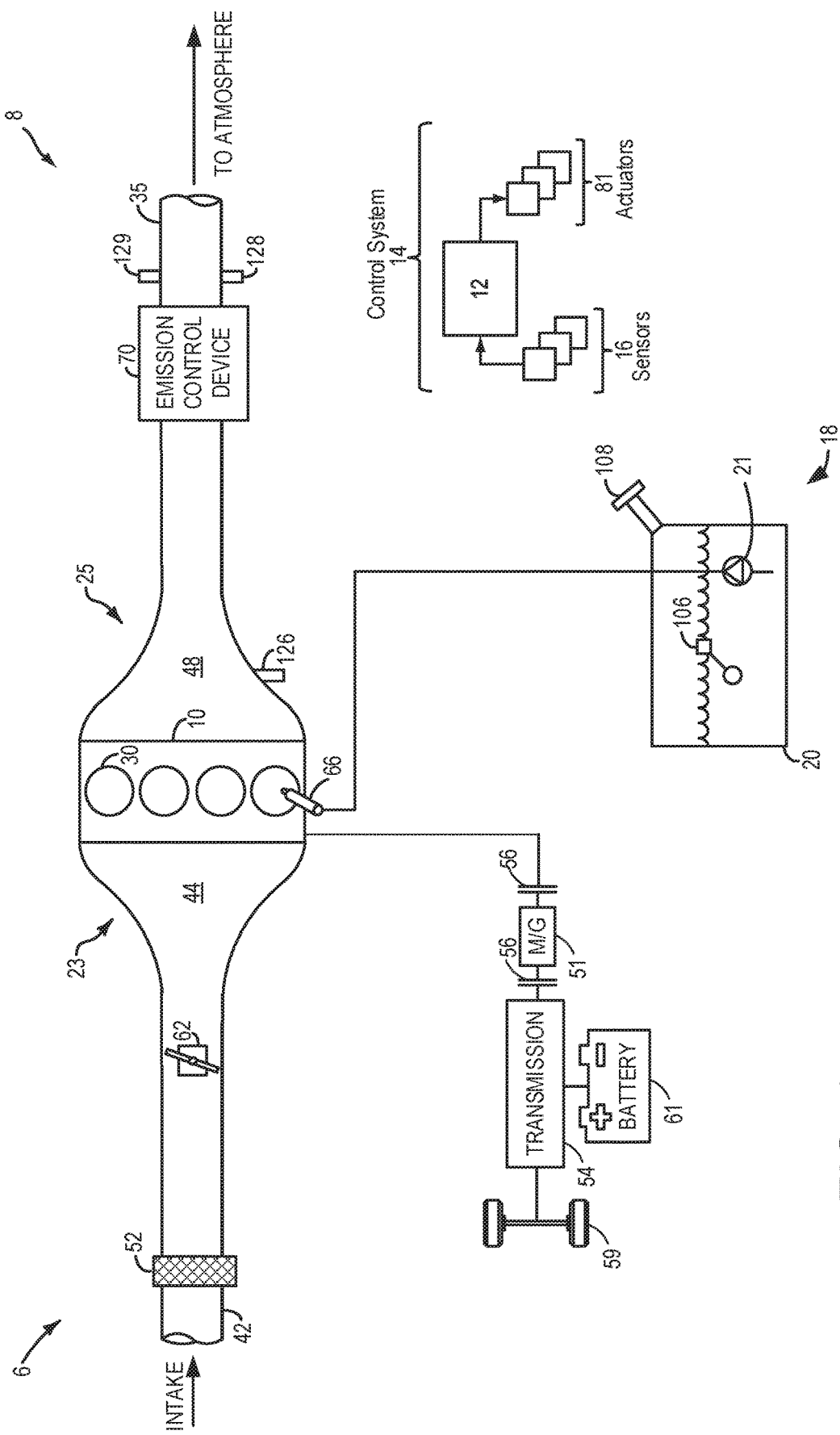
FIG. 1 illustrates a schematic of a hybrid vehicle.
Figure 2A:
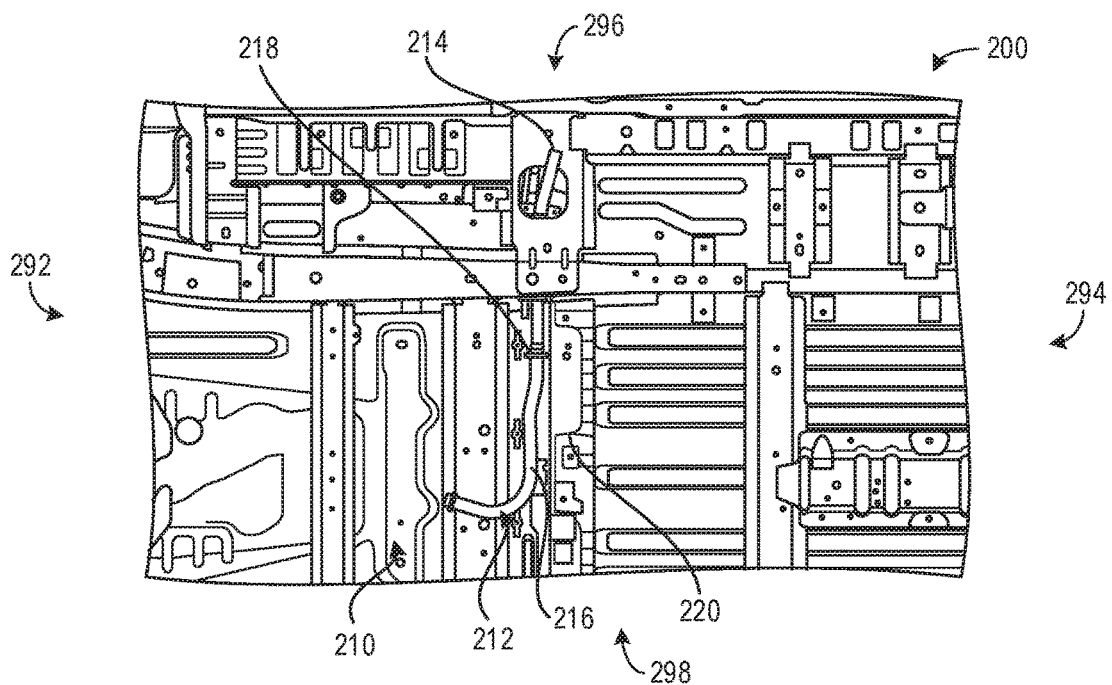
FIG. 2A illustrates a fuel filler pipe traversing along a vehicle underbody.
Figure 2B:
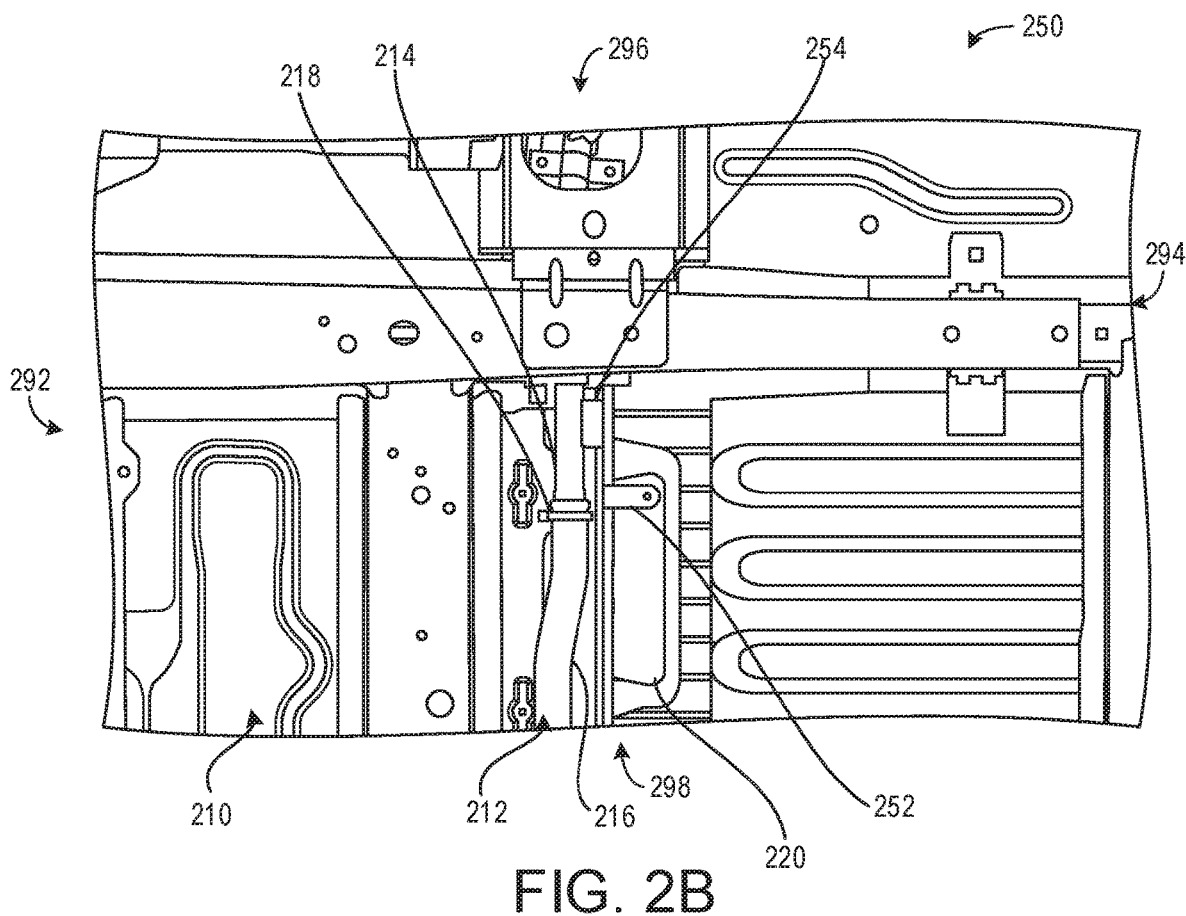
FIG. 2B illustrates a detailed view of the fuel filler pipe traversing alongside a cross-member comprising a bracket.
Figure 3:
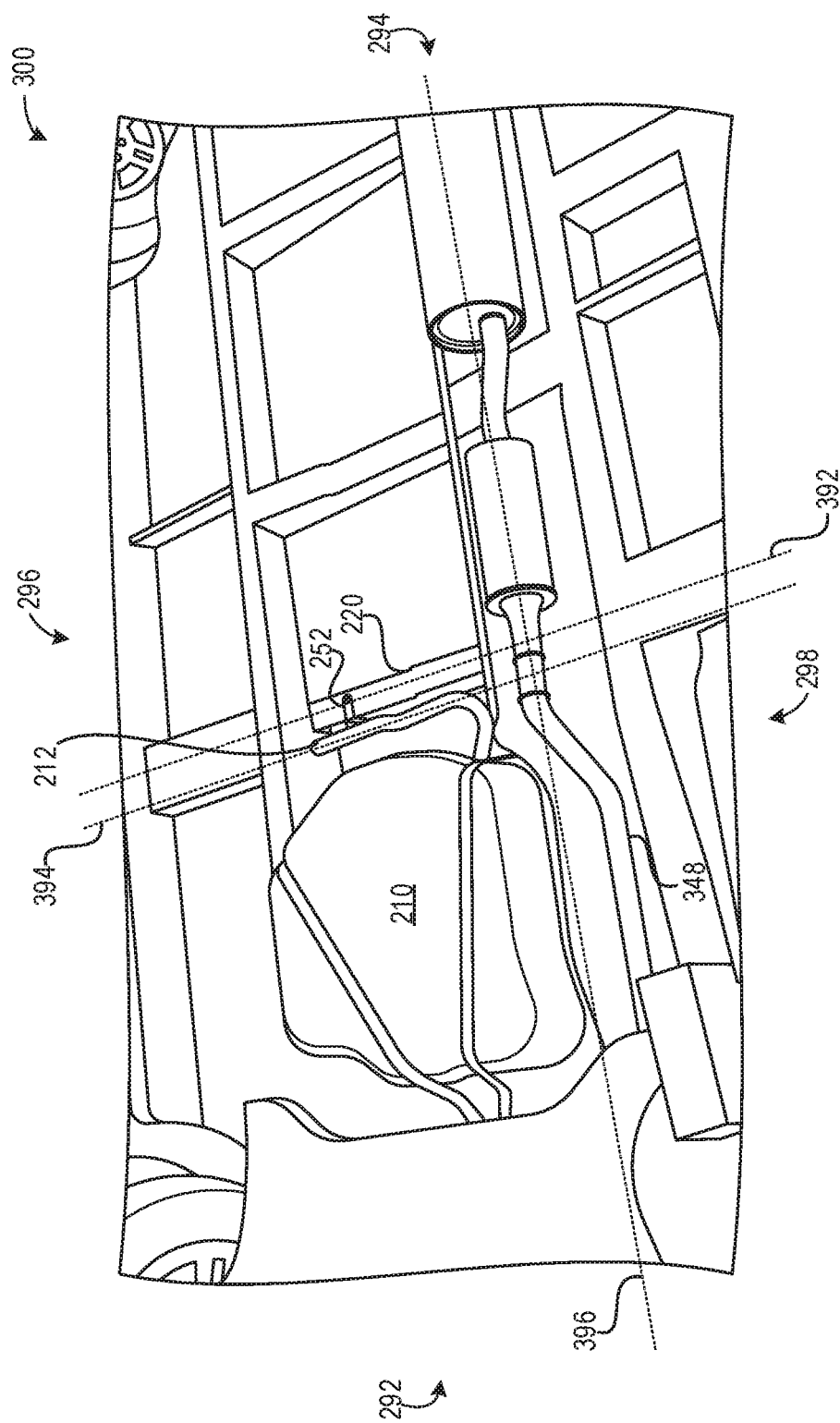
FIG. 3 illustrates a location of the cross-member, bracket, and the fuel filler pipe in relation to other components of the vehicle.

The following description relates to a bracket coupled to a portion of a cross-member adjacent to a fuel filler pipe. The fuel filler pipe may be fluidly coupled to a fuel tank shaped to provide fuel to an engine, as shown in FIG. 1. The fuel filler pipe may extend from an inlet, which may be shaped to flow fuel from an external fuel delivery device, such as a fuel pump of a gas station, to the fuel filler pipe and to an outlet shaped to flow fuel into the fuel tank, as shown in FIG. 2A. A portion of the fuel filler pipe between the inlet and the outlet may be adjacent to a vehicle cross-member, as shown in FIGS. 2B and 3. The portion comprising the inlet may comprise an inflexible material and the portion comprising the outlet may comprise a flexible material. The two materials may overlap near the cross-member. The example of FIG. 2A shows a previous example of the fuel filler pipe being adjacent to the cross-member without a bracket comprising a bumper. In such an example, the fuel filler pipe may move during a vehicle collision or other vehicle maneuver, wherein the fuel filler pipe may press against the cross-member. This pressing may force the inflexible material of the fuel filler pipe to squeeze the flexible material of the fuel filler pipe between it and the cross-member, which may develop a hole in the flexible material, and lead to a leak. FIG. 2B shows a bracket comprising a bumper coupled to the cross-member which may block the fuel filler pipe from contacting the cross-member, thereby preventing the interaction described above for the previous example. The bumper interacting with the fuel filler pipe is shown in FIGS. 4A, 4B, 5A, 5B, 5C, and 7. FIGS. 6A and 6B show detailed views of the bracket and bumper.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a fuel tank 20 coupled to a fuel pump 21, the fuel tank supplying fuel to an engine 10 which propels a vehicle. During a fuel tank refueling event, fuel may be pumped into the vehicle from an external source through refueling port 108. In one example, a fuel filler pipe, such as fuel filler pipe 212 in FIG. 2B, may extend from the refueling port 108 to the fuel tank 20. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, pressure sensor 120, and pressure sensor 129. Other sensors such as additional pressure, temperature, air/fuel ratio, and composition sensors may be coupled to various locations in the vehicle system 6. As another example, the actuators may include fuel injector 66, fuel pump 21, and throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and an electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between crankshaft 40 and electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

Turning now to FIG. 2A, it shows an embodiment of a vehicle underbody 200. In one example, the vehicle underbody 200 may be an underbody for vehicle 6 of FIG. 1. In the example of FIG. 2A, there is shown a fuel tank 210 fluidly coupled to a fuel filler pipe 212. The fuel tank 210 may be arranged closer to a front end 292 of the vehicle underbody 200 than the fuel filler pipe 212. As such, the fuel filler pipe 212 may be arranged closed to a rear end 294 than the fuel tank 210. In one example, the vehicle is front-engined such that the fuel tank 210 is closer to the engine than the fuel filler pipe 212.

The fuel filler pipe 212 may extend from a first side 296 of the vehicle underbody 200 toward a second side 298 laterally. However, the fuel filler pipe 212 may not reach the second side 298 as it turns and extends toward the fuel tank 210.

The fuel filler pipe 212 may be a conduit and/or hose comprising a rubber elastomeric material or other soft, flexible material. Additionally or alternatively, the fuel filler pipe 212 may be a steel or other hard, rigid material pipe. In the example of FIG. 2A, the fuel filler pipe 212 may comprise two sections, wherein a first section 214 comprises an inflexible material, such as steel, and a second section 216 comprises a flexible material, such as rubber. The first section 214 may extend from the first side 296 toward a middle of the vehicle underbody 200 between the first and second sides 296, 298. The second section 216 may be fluidly and physically coupled to the first section 214, as it extends from the first section 214 and extends toward the fuel tank 210.

A cross-member 220 may extend adjacent to each of the first section 214 and the second section 216. As such, the cross-member 220 may be adjacent to a coupling 218 of the first section and the second section 216. In one example, the coupling 218 comprises a zip-tie, a cable seal, or other fastening device. Additionally or alternatively, the coupling 218 may be an internal coupling between the first section 214 and the second section 216, wherein the coupling 218 is a glue or other adhesive material physically coupling an outer surface of the first section 214 to an inner surface of the second section 216. The flexible material of the second section 216 may be stretched and forced over a circumference of an extreme end of the first section 214 such that the second section 216 overlaps with the extreme end of the first section 214. The coupling 218 may hold the overlap of the two sections in place so that the second section 216 does not separate from the first section 214. In this way, the inflexible material of the first section 214 may be pressed against interior surfaces of the flexible material of the second section 216. By doing this, fuel directed through the first section 214 of the fuel filler pipe 212 is directed into a volume of the second section 216, where the fuel may flow toward the fuel tank 210.

In the example of FIG. 2A, the first section 214 and the second section 216 may be spaced away from the cross-member 220 during normal vehicle operating conditions. Herein, normal vehicle operating conditions may include vehicle operating conditions where a vehicle collision is not occurring. Thus, if a vehicle collision is occurring, then vehicle operating conditions are not normal. During the vehicle collision, the fuel filler pipe 212 may move due to an impact and/or a force imparted onto the vehicle. In some examples where the vehicle underbody arrangement is similar to that shown in FIG. 2A, the collision may force the fuel filler pipe 212 to press against the cross-member 220. More specifically, the overlap between the first section 214 and the second section 216 where the coupling 218 is arranged may press against the cross-member 220. This may allow the second section 216 to be squeezed between the first section 214 and the cross-member 220 such that the hard surfaces of the inflexible material and the cross-member 220 generate a hole in the flexible material of the second section 216, thereby resulting in a loss of fuel and/or increased degradation to the vehicle. Additionally or alternatively, degradation of the flexible material of the second section 216 may further include a scratch, cuts, and the like as a result of friction experienced between the first portion 214 and the cross-member 220 during a collision. As a result, repairs costs may increase and an environmental impact of the collision may increase as liquid and/or gaseous fuel flow out of the leaking fuel filler pipe 212.

Turning now to FIG. 2B, it shows a detailed view 250 of the fuel filler pipe 212. More specifically, the detailed view 250 shows the first section 214, the second section 216, the coupling 218, and the cross-member 220. As such, components previously introduced may be similarly numbered in this figure and subsequent figures.

The detailed view 250 further comprises a bracket 252 having a bumper 254 not included in the previous example shown in FIG. 2A. The bracket 252 may comprise a steel material. In one example, the bracket 252 comprises a mild steel material with a carbon content less than 0.3%. The bumper 254 may be physically coupled to the bracket 252 and extend along a space between the cross-member 220 and the first section 214. In one example, the bumper 254 comprises an ethylene propylene diene monomer rubber (EPDM). Additionally or alternatively, the bracket 252 may comprise other types of steel and hard materials and the bumper 254 may comprise other types of elastomeric materials and/or materials configured to absorb forces from touching components.

The bracket 252 may be physically coupled to the cross-member 220 at an area adjacent to the coupling 218. The bracket 252 may be physically coupled to the cross-member 220 via one or more of a weld, a fusion, a fastener, and an adhesive. In one example, a bolt or similar fastening device is used to physically couple the bracket 252 to the cross-member 220 as will be described below with respect to FIG. 5A.

The bumper 254 may press against a portion of the fuel filler pipe 212. In one example, the bumper 254 may press against the first section 214 at a region spaced away from the coupling 218 toward the first side 296 during normal vehicle operation and during vehicle collisions. As will be described in greater detail below with respect to FIG. 7, the bumper 254 may maintain a threshold distance between the fuel filler pipe 212 and the cross-member 220.

Turning now to FIG. 3, it shows an embodiment 300 illustrating a location of the fuel tank 210, the fuel filler pipe 212, the cross-member 220, and the bracket 252. As shown, an exhaust pipe 348, which defines a volume of an exhaust passage, which may be used similarly to exhaust passage 25 of FIG. 1, extends from the front end 292 of the vehicle toward the rear end 294. The exhaust pipe 348 may be arranged further from the first side 296 than each of the fuel tank 210, the fuel filler pipe 212, the cross-member 220, and the bracket 252. As such, the exhaust pipe 348 may be arranged closer to the second side 298 than each of the fuel tank 210, the fuel filler pipe 212, the cross-member 220, and the bracket 252. Each of the cross-member 220 and the fuel filler pipe 212 may extend along a pair of parallel axes perpendicular to an axis of the exhaust pipe 348. That is to say, the cross-member 220 extends along a first lateral axis 392, which is perpendicular to a longitudinal axis 396, parallel to a direction of travel of the exhaust pipe 348. The fuel filler pipe 212 may extend along a second lateral axis 394, parallel to and spaced away from the first lateral axis 392, in a direction perpendicular to the longitudinal axis 396. In one example, the fuel filler pipe 212 extends parallel to the second lateral axis 394 until it reaches a location proximal to the exhaust pipe 348, where the fuel filler pipe 212 turns in a direction perpendicular to the second lateral axis 394 and parallel to the longitudinal axis 396 as it extends toward the fuel tank 210.

Figure 4A:
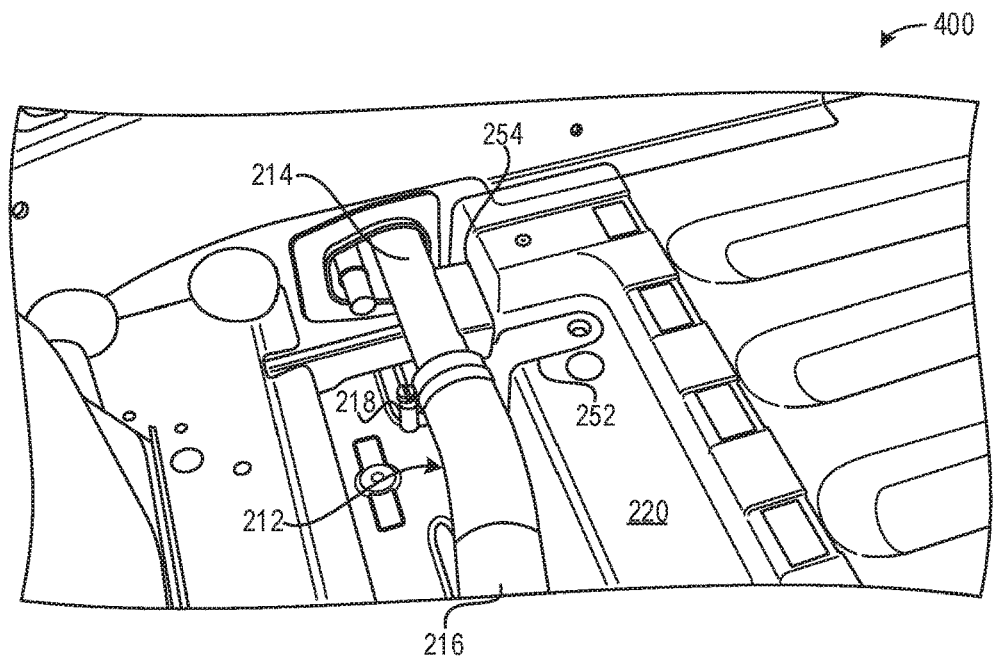
FIGS. 4A and 4B illustrate close-up views of the fuel filler pipe, the cross-member, and the bracket.
Figure 4B:
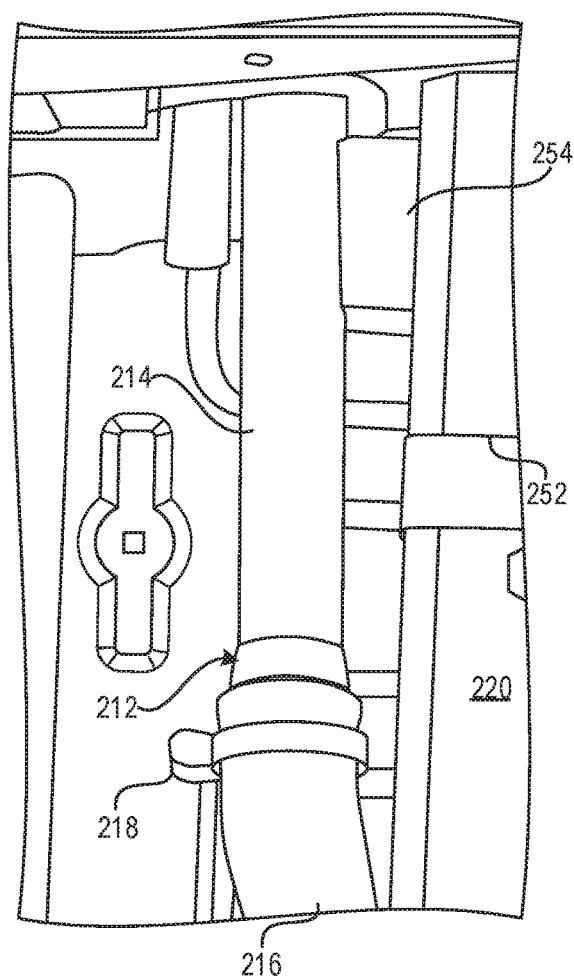

Turning now to FIGS. 4A and 4B, they show views 400 and 450, respectively, illustrating a relationship of the first section 214, the second section 216, and the coupling 218 of the fuel filler pipe 212 with the cross-member 220, the bracket 252, and the bumper 254. FIGS. 4A and 4B are described in tandem herein.

The examples of FIGS. 4A and 4B show a relationship of the fuel filler pipe 212 and bumper 254 during a normal vehicle operation, where a vehicle collision is not occurring. The fuel filler pipe 212 may press into the bumper 254 during the normal vehicle operation. The bumper 254 may depress against a force of the fuel filler pipe 212. However, the bumper 254 may apply a force against the fuel filler pipe 212 such that the fuel filler pipe 212 may not contact the cross-member during normal vehicle operation or non-normal vehicle operations. More specifically, the bumper 254 may apply a force against the first section 214 so that the overlap between the first section 214 and the second section 216 may not contact the cross-member 220. As such, the hard material of the first section 214 may be blocked from contacting the cross-member 220. As such, the inflexible material of the first section 214 may not be compressed against the flexible material of the second section 216 so that a leak or other degradation of the flexible material of the fuel filler pipe 212 may not occur. However, portion of the second section 216, downstream of the coupling 218 relative to a direction of fuel flow through the fuel filler pipe 212 to the fuel tank, may contact the cross-member 220 due to vehicle forces, wherein vehicle forces may include forces generated due to vehicle travel, which may include topographical changes, vehicle accelerations and decelerations, and other vehicle maneuvers.

Figure 5A:
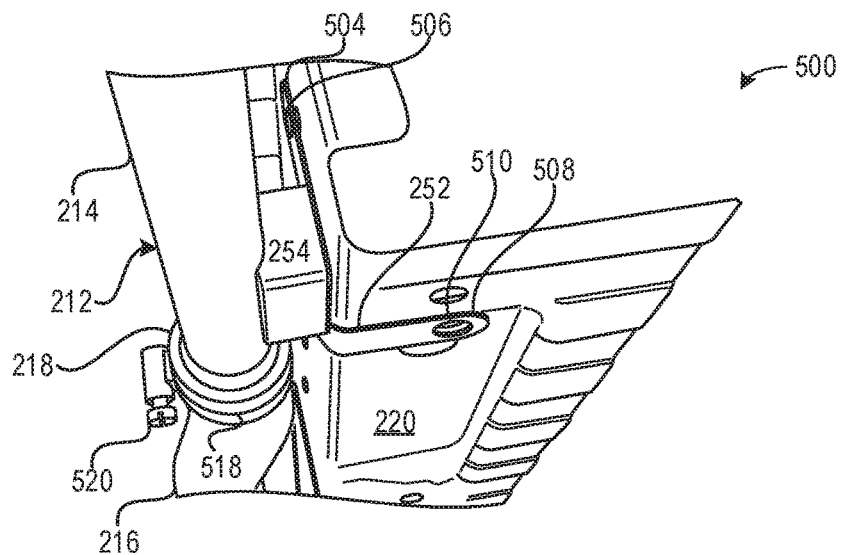
FIGS. 5A, 5B, and 5C illustrate a variety of views of the fuel filler pipe interacting with a bumper of the bracket.
Figure 5B:
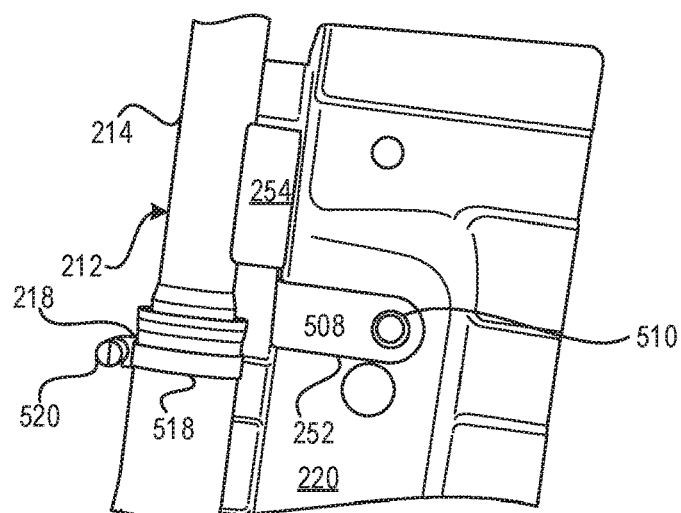
Figure 5C:
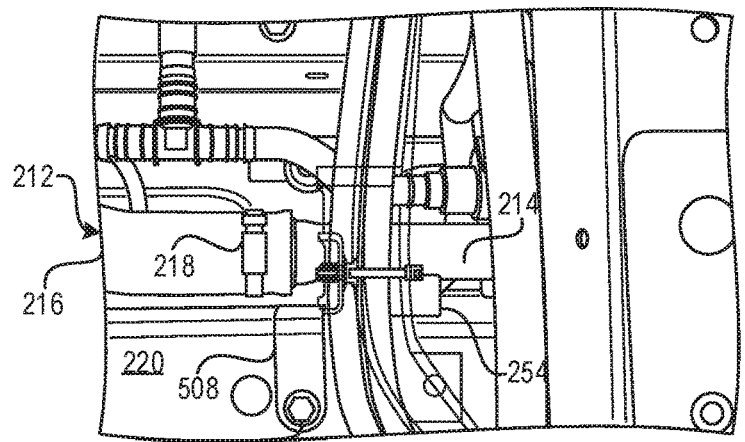
Figure 6A:
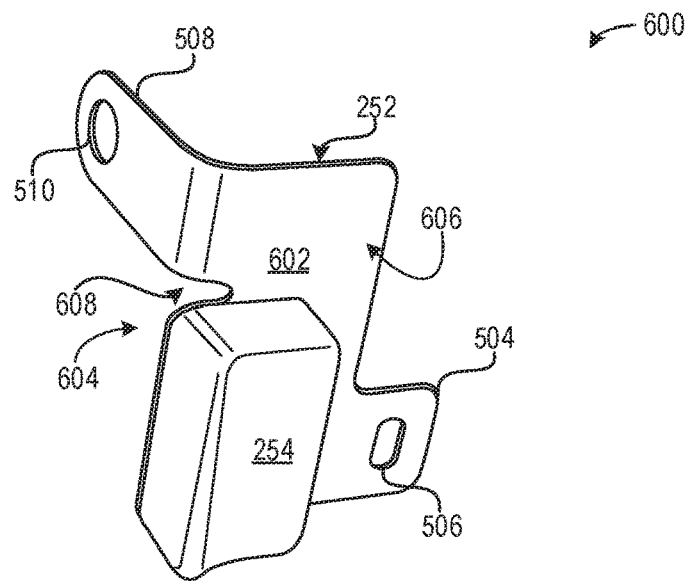
FIGS. 6A and 6B illustrate a front side and a back side of the bracket, respectively.
Figure 6B:
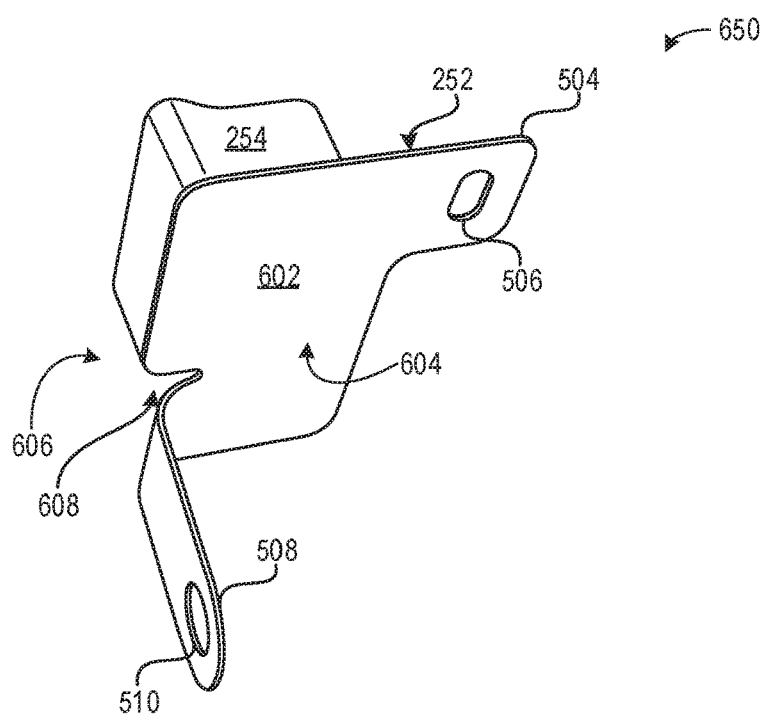

Turning now to FIGS. 5A, 5B, and 5C, they show additional views 500, 525, and 550, respectively, further illustrating a relationship of the fuel filler pipe 212, bumper 254, and cross-member 220 during normal vehicle operation conditions where a vehicle collision is not occurring.

The coupling 218 is also shown in greater detail. The coupling 218 may comprise a band 518 which extends around an entire circumference of the second section 216. As described above, the coupling 218 may be arranged at a region of the fuel filler pipe 212 where the first section 214 and the second section 216 overlap. More specifically, the second section 216 may extend over and envelop a portion of the first section 214 to ensure fuel flows from the first section 214 to the second section 216 without spilling on a ground or vehicle components. The coupling 218 may be tightened around the overlap between the two portions via a screw 520 or other fastening device to block separation of the first section 214 and the second section 216.

The coupling 218 may be downstream of each of the bumper 254 and the bracket 252. As described above, during a vehicle collision or other vehicle maneuver and/or condition, the first section 214 interior to the second section 216 may press against interior surfaces of the second section 216 harder during a vehicle collision as the overlap presses against the cross-member 220. This may create a leak, which may result in fuel spilling from the leak. However, the bumper 254 may block the overlap and other portions of the first section 214 from contacting the cross-member 220 and other vehicle components to block the first section 214 from pressing harder against the interior surfaces of the second section 216.

FIG. 5A further shows a shape of the bracket 252. As shown, the bracket 252 comprises a first arm 504 and a second arm 508. The first arm 504 may extend from the bracket 252 in an area proximal to the bumper 254. The second arm 508 may extend from the bracket 252 and follow a contour of the cross-member 220. More specifically, the second arm 508 may extend below the cross-member 220 such that the second arm 508 is between the cross-member 220 and the ground on which the vehicle touches. The first arm 504 may be between the cross-member 220 and the fuel filler pipe 212.

The first arm 504 may comprise a first arm opening 506, which may align with an opening of a surface of the cross-member 220 facing the fuel filler pipe 212. A fastener or other fastening device may be fastened through the first arm opening and the opening of the cross-member 220 when the openings are aligned so that the bracket 252 is physically coupled to the cross-member.

Likewise, the second arm 508 may comprise a second arm opening 510, which may align with an opening of a surface of the cross-member 220 facing the ground. A fastener or other fastening device, such as bolt 512 in FIG. 5C, may be fastened through the second arm opening 510 and the opening of the cross-member 220 facing the ground when the openings are aligned so that the bracket 252 is physically coupled to the cross-member. In one example, the bracket 252 is completely physically coupled to the cross-member 220 when fasteners extend through the first arm opening 506 and the second arm opening 510 and through corresponding openings of the cross-member 220. When the bracket 252 is completely physically coupled to the cross-member 220, the bracket 252 may be flush with surfaces of the cross-member 220.

Turning now to FIGS. 6A and 6B, they show detailed views 600 and 650, respectively, of the bracket 252 and the bumper 254. The bracket 252 may comprise a body 602 parallel to a first plane. The first arm 504 may extend from the body 602, wherein the first arm 504 is parallel to the body 602 and the first plane. The second arm 508 may extend from the body 602 in a direction substantially perpendicular to the body 602. As such, the second arm 508 may lie in a second plane perpendicular to the first plane.

In one example, the body 602 comprises a rectangular shape, wherein corners of the rectangle may be curved such that the corners are not 90 degrees. In one example, the first arm 504 extends from a first corner of the body 602 and the second arm 508 extends from a second corner of the body 602. The first corner may be diagonally opposite to the second corner. That is to say, the first and second corners may be separated by more than one side of the bracket 504.

As the second arm 508 extends from the second corner, the second corner may curve away from the body 602 such that a transition of the body 602 to the second arm 508 is gradual and a 90 degree angle is not formed. In this way, the shape of the bracket 252 and the first arm 504 and second arm 508 extending therefrom may avoid 90 degree shapes, which may mitigate more evenly distribute forces applied to the bracket 252. This may decrease a degradation of the bracket 252 and other surrounding components.

The bumper 254 may extend from a side of the bracket 252 facing away from the cross-member. More specifically, the bracket 252 comprises a first side 604 which may be in face-sharing contact with the cross-member when physically coupled to the cross-member. The bracket 252 may further comprise a second side 606, opposite the first side 604, wherein the second side 606 faces a fuel filler pipe. In this way, the first side 604 may face a rear of the vehicle and the second side 606 may face a front of the vehicle. The bumper 254 may be physically coupled to the second side 606 via adhesives, fasteners, or the like. The bumper 254 may extend from a third corner, separating the first and second corners, to a gap 608. The gap 608 may correspond to a portion of the bracket 252 from which the second arm 508 extends away from the body 602. In one example, the gap 608 is a cutout arranged in the bracket 252 between an extreme end of the bumper 254 and a transition of the second arm 504 away from the body 602.

Figure 7:
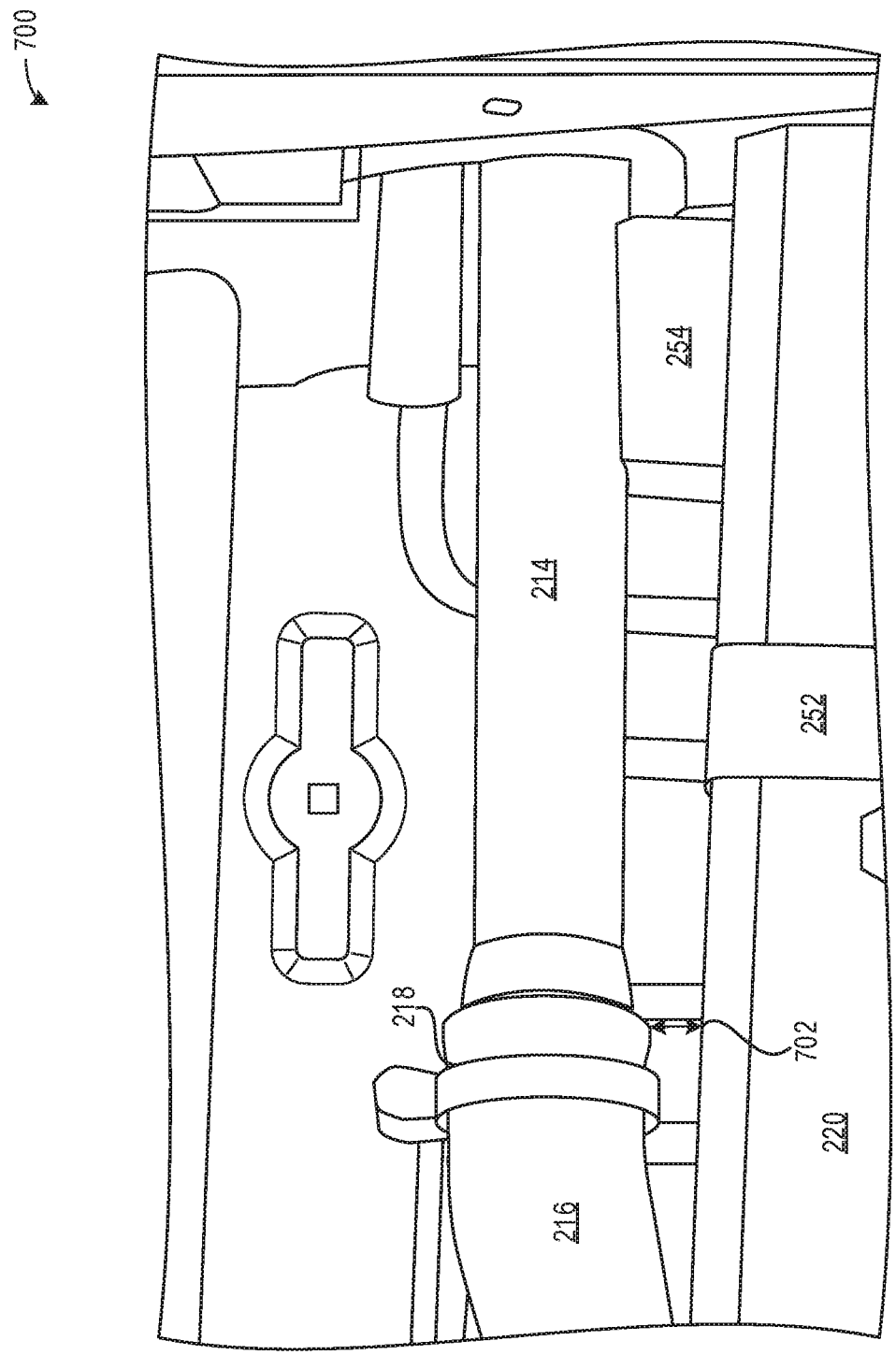
FIG. 7 illustrates a clearance maintained between the fuel filler pipe and the cross-member during a vehicle collision.

Turning now to FIG. 7, it shows an embodiment 700 where a vehicle collision is occurring. Thus, a relationship illustrated in the example of FIG. 7 may be outside of a normal vehicle operating condition. Double headed arrow 702 illustrates a threshold distance maintained between the overlap of the first and second sections 214, 216, and the cross-member 220. In one example, the vehicle collision is a side on collision from a first side (e.g., first side 296 of FIG. 2B) of the vehicle parallel to the first and second lateral axes (e.g., first and second lateral axes 392, 394). Additionally or alternatively, the vehicle collision may be from a second side (e.g., second side 298 of FIG. 2B), a front side (e.g., front side 292 of FIG. 2B), and/or a rear side (e.g., rear side 294 of FIG. 2B) without departing from the scope of the present disclosure.

In some examples, the threshold distance 702 may be greater than 1 mm. In other examples, additionally or alternatively, the threshold distance 702 may be between 5 mm and 20 mm. In other examples, additionally or alternatively, the threshold distance 702 may be between 5 mm and 15 mm. In other examples, additionally or alternatively, the threshold distance 702 may be between 7 mm and 10 mm. In one example, the threshold distance 702 is 8.34 mm. As such, the inflexible material of the first section 214 may be blocked from contacting the cross-member 220 due to the bumper 254 pressing against a portion of the first section 214 upstream of the coupling 218. As such, the flexible material of the second section 216 may also be spaced away from the cross-member 220 even when a vehicle collision occurs. It can be particularly advantages to provide spacing of at least 5 mm due to the particular structure illustrated herein in that it balances the need for packaging space and movement during operation and under impact.

In this way, a fuel filler pipe may be spaced away from a cross-member of a vehicle underbody through a range of vehicle conditions including a vehicle side-on collision occurring at a side of the vehicle corresponding to the fuel filler pipe. A bumper of a bracket physically coupled to the cross-member may press against the fuel filler pipe to block the fuel filler pipe and its flexible and inflexible sections for colliding with the cross-member. The technical effect of the bracket comprising the bumper is to mitigate a likelihood of a leak developing in the fuel filler pipe during a side-on collision due to an impact between the fuel filler pipe and the cross-member.

In another representation, the embodiments described above are for a hybrid vehicle comprising each of an internal combustion engine and an electric motor for propelling a vehicle.

An embodiment of a system comprises a vehicle cross-member traversing a vehicle underbody adjacent to a fuel filler pipe, the cross-member comprising a bracket having a bumper coupled thereto and in contact with the fuel filler pipe. A first example of the system further includes where the fuel filler pipe comprises a first section comprising a metal material, the fuel filler pipe further comprising a second section comprising a flexible material, and where the first section and second section are fluidly coupled at an overlap between the first section and the second section. A second example of the system, optionally including the first example, further includes where the bumper presses against the first section and maintains a threshold distance between the overlap and the cross-member. A third example of the system, optionally including the first and/or second examples, further includes where the cross-member is parallel to the first lateral axis, and where the fuel filler pipe is parallel to a second lateral axis before it turns toward a fuel tank in a direction angled to the second lateral axis. A fourth example of the system, optionally including one or more of the first through third examples, further includes where the first lateral axis is parallel to the second lateral axis, and where fuel filler pipe turns away from the second lateral axis at a location downstream of the bracket relative to a direction of fuel flow. A fifth example of the system, optionally including one or more of the first through fourth examples, further includes where an exhaust pipe extending along a longitudinal axis, wherein the longitudinal axis is perpendicular to each of the first lateral axis and the second lateral axis, and where the fuel filler pipe turns away from the second lateral axis at a location proximal to the exhaust pipe. A sixth example of the system, optionally including one or more of the first through fifth examples, further includes where the fuel filler pipe is shaped to admit and deliver fuel from a first side exterior of a vehicle to a fuel tank.

An embodiment of a fuel system comprises a fuel tank arranged toward a front side of a vehicle and a cross-member arranged toward a rear side of the vehicle, and a fuel filler pipe arranged between the fuel tank and the cross-member, where the fuel filler pipe is shaped to admit fuel from a side exterior of the fuel to the fuel tank, wherein the fuel filler pipe is maintained a threshold distance away from the cross-member via a bracket comprising a bumper. A first example of the fuel system further comprises where the bracket is physically coupled to the cross-member. A second example of the fuel system, optionally including the first example, further comprises where the bracket comprises a first arm and a second arm extending from a body of the bracket, where the first arm extends from a first corner and the second arm extends from a second corner, the second corner being arranged diagonally to the first corner. A third example of the fuel system, optionally including the first and/or second examples, further includes where the bracket comprises a first side flush and in face-sharing contact with the cross-member, the bracket further comprising a second side facing the fuel filler pipe, and where the bumper extends from the second side. A fourth example of the fuel system, optionally including one or more of the first through third examples, further includes where the fuel filler pipe comprises an inflexible material inserted into a flexible material, and where the bracket is arranged on a portion of the cross-member upstream of an overlap between the inflexible material and the flexible material, and where the bumper is pressed against a portion of the inflexible material upstream of the overlap. A fifth example of the fuel system, optionally including one or more of the first through fourth examples, further includes where the threshold distance is arranged between the overlap and the cross-member, and where the threshold distance is greater than 5 mm. A sixth example of the fuel system, optionally including one or more of the first through fifth examples, further includes where the bumper absorbs a force of the fuel filler pipe during a vehicle collision. A seventh example of the fuel system, optionally including one or more of the first through sixth examples, further includes where the bumper is arranged between the fuel filler pipe and the cross-member.

An example of a vehicle underbody comprises a fuel filler pipe arranged adjacent to a cross-member, the fuel filler pipe extending from a side of the vehicle underbody along a lateral axis prior to turning in a direction angled to the lateral axis toward a fuel tank, wherein the fuel filler pipe comprises an inflexible material and a flexible material, wherein a coupling is arranged at an overlap between the inflexible material and the flexible material, further comprising where a bumper physically coupled to a bracket in face-sharing contact with the cross-member touches the inflexible material at a location upstream of the overlap relative to a direction of fuel flow through the fuel filler pipe. A first example of the vehicle underbody further comprises where the bracket comprises a first arm extending parallel to a body of the bracket, the bracket further comprising a second arm extending perpendicularly to the body of the bracket. A second example of the vehicle underbody, optionally including the first example, further comprises where the bumper maintains a threshold distance between the overlap and the cross-member during a side-on vehicle collision, and where the side-on vehicle collision occurs at the side. A third example of the vehicle underbody, optionally including the first and/or second examples, further includes where the inflexible material extends in a direction parallel to the cross-member. A fourth example of the vehicle underbody, optionally including one or more of the first through third examples, further includes where the inflexible material is inserted into the flexible material, and where the coupling traverses around a circumference of the flexible material at the overlap.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a vehicle cross-member traversing a vehicle underbody adjacent to a fuel filler pipe, the cross-member comprising a bracket having a side surface from which a bumper coupled thereto extends, the bumper in contact with the fuel filler pipe and separating the fuel filler pipe from the side surface, the bracket having a first arm extending from the side surface and a second arm extending away from the side surface opposite from the bumper, the bumper comprising an elastomeric material.

2. The system of claim 1, wherein the fuel filler pipe comprises a first section comprising a metal material, the fuel filler pipe further comprising a second section comprising a flexible material, and where the first section and the second section are fluidly coupled at an overlap between the first section and the second section.

3. The system of claim 2, wherein the bumper presses against the first section and maintains a threshold distance between the overlap and the cross-member.

4. The system of claim 1, wherein the cross-member is parallel to a first lateral axis, and where the fuel filler pipe is parallel to a second lateral axis before it turns toward a fuel tank in a direction angled to the second lateral axis.

5. The system of claim 4, wherein the first lateral axis is parallel to the second lateral axis, and where the fuel filler pipe turns away from the second lateral axis at a location downstream of the bracket relative to a direction of fuel flow.

6. The system of claim 4, further comprising an exhaust pipe extending along a longitudinal axis, wherein the longitudinal axis is perpendicular to each of the first lateral axis and the second lateral axis, and where the fuel filler pipe turns away from the second lateral axis at a location proximal to the exhaust pipe.

7. The system of claim 1, wherein the fuel filler pipe is shaped to admit and deliver fuel from a first side exterior of a vehicle to a fuel tank, and wherein the bracket includes a gap corresponding to a portion of the bracket from which the second arm extends away therefrom, wherein there is a cutout arranged in the bracket between an extreme end of the bumper and a transition of the second arm away therefrom.

8. A fuel system comprising:
a fuel tank arranged toward a front side of a vehicle and a cross-member arranged toward a rear side of the vehicle; and
a fuel filler pipe arranged between the fuel tank and the cross-member, where the fuel filler pipe is shaped to admit fuel from a side exterior of the fuel filler pipe to the fuel tank; wherein
the fuel filler pipe is maintained a threshold distance away from the cross-member via a bracket comprising a bumper, wherein the bracket comprises a first arm extending parallel to a body of the bracket and a second arm extending perpendicularly to the body of the bracket, where the first arm extends from a first corner of the bracket and the second arm extends from a second corner of the bracket, the second corner being arranged diagonally to the first corner, the second arm extends below the cross-member such that the second arm is between the cross-member and the ground on which the vehicle touches.

9. The fuel system of claim 8, wherein the bracket is physically coupled to the cross-member.

10. The fuel system of claim 8, wherein the bracket comprises a first side flush in face-sharing contact with the cross-member, the bracket further comprising a second side facing the fuel filler pipe, and where the bumper extends from the second side.

11. The fuel system of claim 8, wherein the fuel filler pipe comprises an inflexible material inserted into a flexible material, and where the bracket is arranged on a portion of the cross-member upstream of an overlap between the inflexible material and the flexible material, and where the bumper is pressed against a portion of the inflexible material upstream of the overlap.

12. The fuel system of claim 11, wherein the threshold distance is arranged between the overlap and the cross-member, and where the threshold distance is greater than 5 mm.

13. The fuel system of claim 8, wherein the bumper absorbs a force of the fuel filler pipe during a vehicle collision.

14. The fuel system of claim 8, wherein the bumper is arranged between the fuel filler pipe and the cross-member.

15. A vehicle underbody comprising:

a fuel filler pipe arranged adjacent to a cross-member, the fuel filler pipe extending from a side of the vehicle underbody along a lateral axis prior to turning in a direction angled to the lateral axis toward a fuel tank, wherein the fuel filler pipe comprises an inflexible material and a flexible material, wherein a coupling is arranged at an overlap between the inflexible material and the flexible material, further comprising where a bumper physically coupled to a bracket in face-sharing contact with the cross-member touches the inflexible material at a location upstream of the overlap relative to a direction of fuel flow through the fuel filler pipe, wherein the bracket comprises a first arm extending parallel to a body of the bracket, the bracket further comprising a second arm extending perpendicularly to the body of the bracket.

16. The vehicle underbody of claim 15, wherein the bumper maintains a threshold distance between the overlap and the cross-member during a side-on vehicle collision, and where the side-on vehicle collision occurs at the side, and where the bumper is physically coupled to the bracket via one or more of fasteners, welds, adhesives, and fusions.

17. The vehicle underbody of claim 15, wherein the inflexible material extends in a direction parallel to the cross-member.

18. The vehicle underbody of claim 15, wherein the inflexible material is inserted into the flexible material, and where the coupling traverses around a circumference of the flexible material at the overlap.

* * * * *